US012321177B2

(12) United States Patent
Churavy et al.

(10) Patent No.: US 12,321,177 B2
(45) Date of Patent: Jun. 3, 2025

(54) SENSOR SYSTEM AND SENSING METHOD FOR AN AUTONOMOUS DEVICE

(71) Applicant: MTD Products Inc, Valley City, OH (US)

(72) Inventors: Christopher J. Churavy, Lakewood, OH (US); Ayala Raanan, Raanana (IL)

(73) Assignee: MTD PRODUCTS INC

( * ) Notice: Subject to any disclaimer, the term of this patent is extended or adjusted under 35 U.S.C. 154(b) by 623 days.

(21) Appl. No.: 17/488,507

(22) Filed: Sep. 29, 2021

(65) Prior Publication Data

US 2022/0107653 A1   Apr. 7, 2022

Related U.S. Application Data

(60) Provisional application No. 63/087,400, filed on Oct. 5, 2020.

(51) Int. Cl.
*A01D 34/00*   (2006.01)
*B60W 60/00*   (2020.01)
(Continued)

(52) U.S. Cl.
CPC ......... *G05D 1/0259* (2013.01); *A01D 34/008* (2013.01); *B60W 60/0025* (2020.02); *A01D 2101/00* (2013.01); *B60W 2420/50* (2013.01)

(58) Field of Classification Search
CPC ............. A01D 2101/00; A01D 34/008; B60W 2420/50; B60W 60/0025; G05D 1/0259
See application file for complete search history.

(56) References Cited

U.S. PATENT DOCUMENTS 5,652,472 A  *  7/1997  Tozoni ............. H02N 15/00
                                          104/282
9,547,050 B2      1/2017  Sartee et al.
(Continued)

FOREIGN PATENT DOCUMENTS

CN       102654479 B  *  5/2016
EP         0270322 B1    10/1991
(Continued)

OTHER PUBLICATIONS

Machine Translation of JP-2005189200-A obtained from Clarivate Analytics on Feb. 8, 2024 (Year: 2005).*
(Continued)

*Primary Examiner* — Thomas Ingram
*Assistant Examiner* — Michael J Herrera
(74) *Attorney, Agent, or Firm* — Wegman Hessler Valore

(57) ABSTRACT

An obstruction sensing system for an autonomous device can include a chassis including a drive system for movement relative to a working surface, a shell resiliently mounted to the chassis and movable relative to the chassis in response to a force applied to the shell, a sensor assembly comprising a single sensor disposed on the chassis and a magnet disposed on and movable with the shell in response to the force applied to the shell, wherein the sensor is configured to output a three-axis magnetic flux vector in response to a movement of the magnet. A sensing method for an autonomous device can include detecting a polarity change in the sensor and in response determining that an obstruction has been detected, evaluating, by a processing component, a three-axis magnetic flux vector, and calculating at least one of a direction and a magnitude of a deflection based on the evaluation.

17 Claims, 6 Drawing Sheets

(51) Int. Cl.
    *G05D 1/00*     (2006.01)
    *A01D 101/00*     (2006.01)

(56) References Cited

U.S. PATENT DOCUMENTS

| | | |
|---|---|---|
| 10,375,880 B2 | 8/2019 | Morin et al. |
| 2007/0165512 A1* | 7/2007 | Harada ................ G11B 9/1436 |
| 2010/0265176 A1* | 10/2010 | Olsson .................... G06F 3/016 |
| | | 345/161 |
| 2012/0274320 A1* | 11/2012 | Sato .......................... G01L 1/14 |
| | | 324/239 |
| 2018/0184583 A1* | 7/2018 | Morin ...................... B25J 5/007 |
| 2019/0265718 A1* | 8/2019 | Lee ........................ B25J 13/086 |
| 2021/0000008 A1* | 1/2021 | Svensson ............... A01D 75/20 |
| 2022/0069745 A1* | 3/2022 | Figie ...................... H02K 15/03 |

FOREIGN PATENT DOCUMENTS

| | | |
|---|---|---|
| EP | 02692220 B1 | 4/2016 |
| JP | 2005189200 A * | 7/2005 |
| WO | 2018174777 A1 | 9/2018 |
| WO | 2020169318 A1 | 8/2020 |

OTHER PUBLICATIONS

Machine Translation of CN-102654479-B obtained from Clarivate Analytics on Feb. 8, 2024 (Year: 2016).*
International Search Report and Written Opinion issued in International Application No. PCT/US2021/052516 dated Jan. 24, 2022; 12 pages.

\* cited by examiner

SENSOR SYSTEM AND SENSING METHOD FOR AN AUTONOMOUS DEVICE

CROSS REFERENCE TO RELATED APPLICATIONS

This application claims the benefit of U.S. Provisional Application No. 63/087,400, filed Oct. 5, 2020, the entire disclosure of which is incorporated herein by reference.

FIELD OF THE INVENTION

The disclosed technology pertains to domestic robotic systems and apparatuses and methods for sensor based obstruction detection, for example, sensor systems and methods for detecting objects or obstructions in the operating environment of an autonomous device such as a robotic mower.

BACKGROUND

Autonomous machines and devices, such as autonomous robots, have been designed for performing various industrial and domestic functions. These domestic functions include lawn mowing, vacuum cleaning, floor sweeping and maintenance. The autonomous device operates by navigating around an environment, and can include an outer body or shell mounted to a chassis. The body contacts objects that the autonomous device encounters as it moves about a work area, which may hinder the movement of the autonomous device. Conventional systems for detecting objects sometimes include mechanical switches, capacitive sensors, and multiple magnets which may provide an indication of whether the machine has encountered an obstacle.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Provided herein, in one or more embodiments of the disclosed technology, are sensor systems and methods for obstacle detection for an autonomous device comprising a chassis including a drive system for movement relative to a working surface, a shell resiliently mounted to the chassis and movable relative to the chassis in response to a force applied to the shell, and a sensor assembly comprising a single sensor disposed on the chassis and a magnet disposed on and movable with the shell in response to the force applied to the shell, wherein the sensor is configured to output a three-axis magnetic flux vector in response to a movement of the magnet.

In further embodiments, the disclosed technology provides a system. The system can include a mobile robot comprising chassis, a shell moveably mounted on the chassis, a sensor assembly including a magnet disposed on the shell and a single three-axis sensor disposed on the chassis such that the magnet moves away from the sensor in response to the contact between the shell and an obstacle, wherein relative motion between the magnet and the sensor causes the sensor to produce output signals, and a processing component, configured to receive the output signals from the sensor and to determine a direction and a magnitude of movement of the shell relative to the chassis.

In an embodiment, a mobile robot includes a chassis movable relative to a working area, the chassis comprising a single piece three-axis detection sensor, a shell mounted on the chassis and movable relative to the chassis in response to a force applied to the shell, the shell includes a magnet attached to and movable with an inner surface of the shell in response to the force applied to the shell, wherein the sensor is configured to output a three-axis magnetic flux vector including measurements in each of a X axis, Y axis and Z axis in response to a movement of the magnet, the electrical signal indicative of at least one of a direction and a magnitude of a deflection.

In an embodiment, a sensing method for use in an autonomous device includes a single piece three-axis detection sensor, wherein the sensor is configured to sense a polarity of a single movably arranged magnet and to generate a three-axis magnetic flux vector including detecting a polarity change in the sensor and in response determining that an obstruction has been detected, evaluating, by a processing component a three-axis magnetic flux vector; and calculating at least one of a direction and a magnitude of a deflection based on the evaluation.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1A:
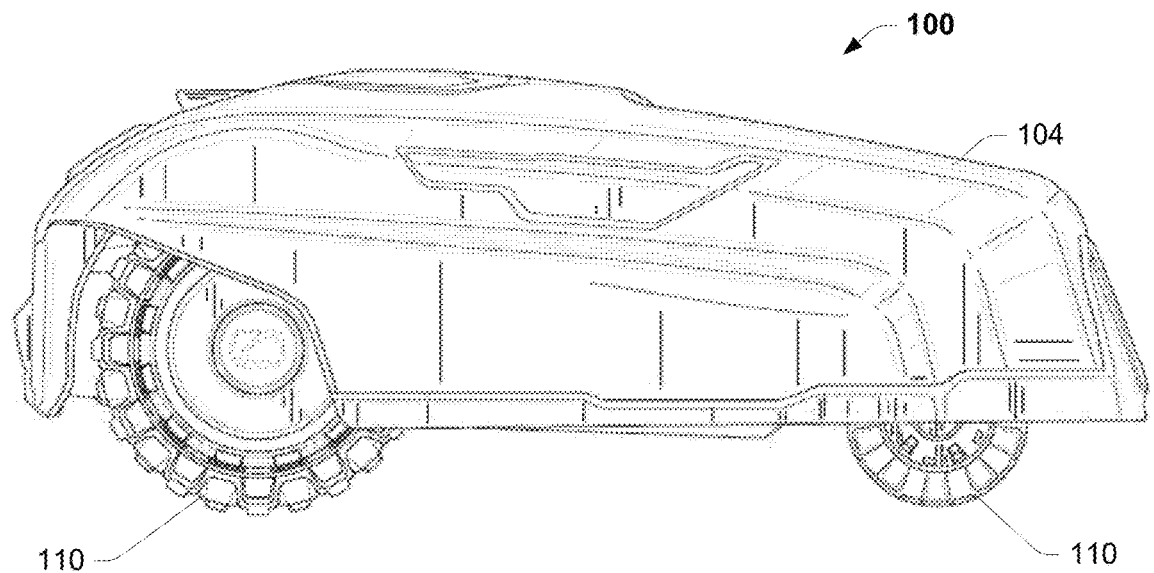
FIGS. 1A and 1B illustrate example autonomous devices including systems for obstacle detection.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to devices and methods for obstacle detection for a mobile robot are described herein, it should be understood that the equipment calibration applications, devices and methods are not so limited and modifications may be made without departing from the scope of the present disclosure. The scope of the systems, methods, mobile devices and mobile applications for calibrating outdoor power equipment are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used herein, the terms "autonomous mower", "autonomous device", "robotic mower", "robot", "device" and/or "vehicle" are used interchangeably and refer to an autonomous robot, or most any autonomous device, vehicle or machine that performs various tasks and functions including lawn mowing, lawn maintenance, vacuum cleaning, floor sweeping and the like.

Mechanical switches and capacitive sensors take up valuable space in a compact device, can be unreliable or affected by moisture, dirt or other harsh conditions of an outdoor environment. Conventional sensing devices can be sensitive to placement, and thus require care and effort in the placement. The disclosed single piece sensor is cost effective and efficient, and simplifies the manufacturing process since the placement of a single sensor, as opposed to multiple sensors, provides reliable results.

FIG. 1A shows an example autonomous device 100 (also referred to as a robot 100) that can detect contact with obstacles in its working environment. The autonomous device 100 includes a chassis 102 (shown in FIG. 1B) and a shell 104, or body, resiliently mounted to the chassis 102. The shell 104 substantially surrounds the robot chassis 102 and its associated components and provides protection for the parts of the robot mower 100 included on the chassis 102.

Figure 1B:
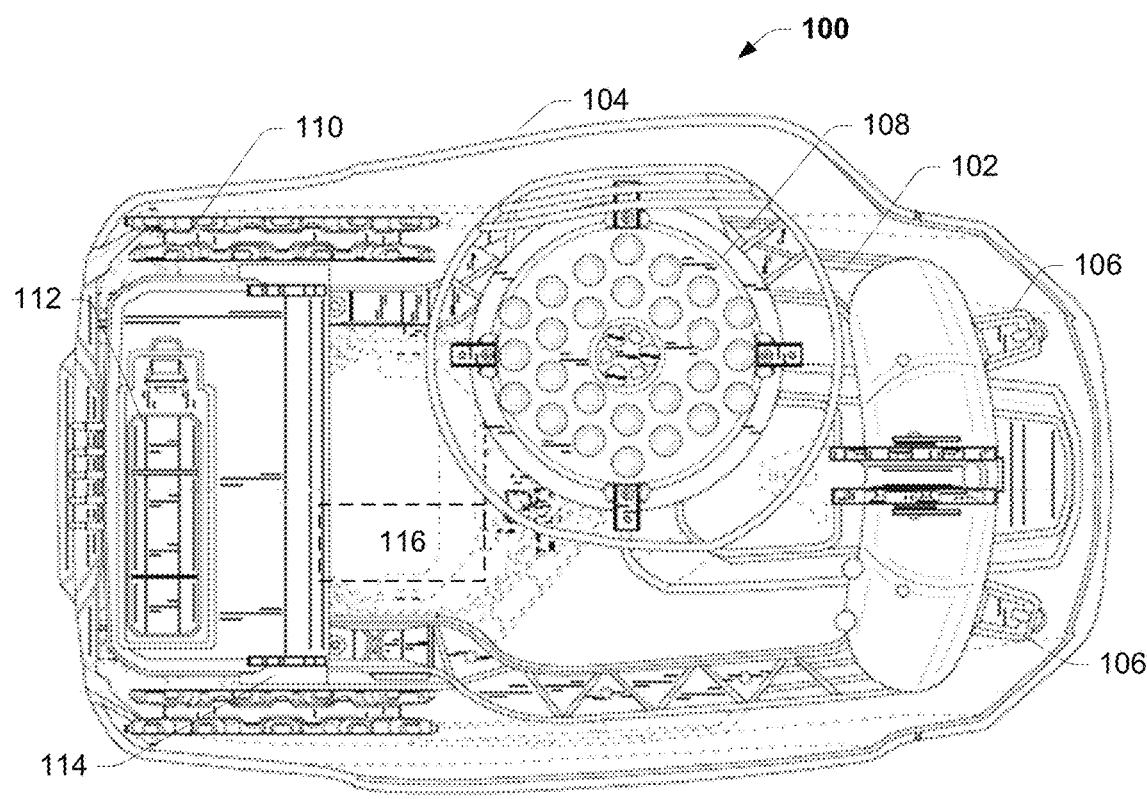

FIG. 1B is a bottom view of the autonomous device 100. The shell 104 can be resiliently attached to a chassis 102 with mounting attachments 106. The mounting attachments 106 support and connect the shell 104 to the chassis 102 and allow the shell 104 to move relative to the chassis 102 when an outside force is applied to the shell 104. The mounting attachments 106 can include elastic fittings such as rubber bushings, springs, or other resilient or elastic structures, that allow the shell 104 to move, and then return to its original position when the force is removed. The autonomous device 100 can include other assemblies and features attached to, or carried by, the chassis 102, for example, a cutting element 108, wheels 110, power source 112, drive system 114 and processing component 116.

In operation, the autonomous device 100 moves about a work area and can come into contact with obstacles or other objects that can hinder or prevent movement of the autonomous device 100. During movement, the shell 104 can contact an object. As the autonomous device 100 contacts the object, a sensor assembly 200 including a single sensor 202 (shown in FIGS. 2A and 2B) and a single magnet 204 associated with the autonomous device 100 generates and outputs electrical signals indicative of the direction and magnitude of movement of the shell 104. The processing component 116 of the autonomous device 100 receives these electrical signals and uses them to determine one or more attributes of the force, such as, a magnitude of the force, a direction of the force, a location of the force, or a duration of the force.

Data associated with the direction and the location of the force can be used to determine the location of an obstacle in a working environment relative to the autonomous device 100. The processing component 116 can provide navigational and drive commands based on a determination of the one or more attributes of the force. For example, the navigational and drive commands can cause the autonomous device to manage contact with the object in an efficient an expected manner by instructing the autonomous device to move in a reverse direction, stop in place, or otherwise avoid continued contact with the sensed object.

The processing component 116 can include hardware, software, and/or firmware components configured to receive, sample, filter, convert, process and use data, for example, data associated with the disclosed obstruction detection systems, and other sensors and inputs.

In an embodiment, processing component 116 includes a microprocessor, data processing hardware and software, memory, and other associated hardware, software and algorithms for obstruction detection of the autonomous device 100. Processing component 116 can perform operations associated with execution of the disclosed algorithms, and other algorithms, evaluation of data, information determination, analog to digital signal conversion, signal sampling, signal filtering, and most any other function related to obstruction detection and behavior determination.

The disclosed technology can be implemented as "computer readable instructions", algorithms and/or modules for execution by the processing component 116. Computer readable instructions can be provided as program modules, such as functions, objects, Application Programming Interfaces (APIs), data structures, and the like, that perform particular tasks or implement particular abstract data types.

In some embodiments, the processing component 116 can comprise a database or data structure (e.g., embodied as an array, look-up table, linked list, hash table, and the like) that stores threshold settings for magnitude and/or direction of a displacement. As an example, the look-up table 116 can be programmed to generate a threshold value such as a deflection threshold.

Different thresholds can be defined, for example, depending on the direction and/or the magnitude of the displacement. In an embodiment, the threshold setting can be function of the calibration data. The calibration data can include theoretical displacement data and/or displacement data measured or gathered during operation of the autonomous device 100. Other considerations for the threshold can include a desired sensitivity of the detection. For example, a relatively low displacement measurement caused when the robot 100 is jostled as it moves about a work area can fall below the deflection threshold so as to allow uninterrupted operation of the robot 100.

In an embodiment, the sensor 102 measurement comprises a single three-dimensional magnetic flux vector (three-axis magnetic flux vector) including three sensor values. A function (i.e. ratio, sum of squares, etc.) for the sensor 102 measurement can be derived, and then the function output value is compared to the threshold. As used herein, the terms "three-dimensional magnetic flux vector" and "three-axis magnetic flux vector" are used interchangeably and refer to the output of the sensor 102.

Figure 2A:
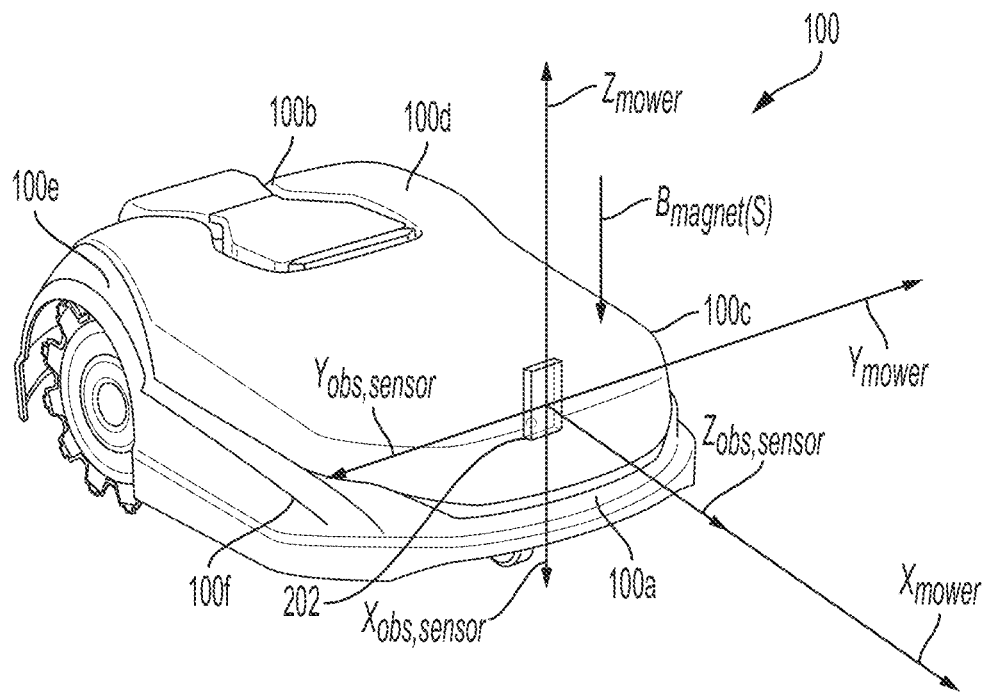
FIGS. 2A, 2B and 2C illustrate example systems for obstacle detection for an autonomous device.

FIG. 2A illustrates an example structure of an autonomous device 100 including a shell 104 mounted to the autonomous device chassis 102. In this example, the autonomous device 100 includes a front portion 100*a*, rear portion 100*b*, and left front 100*c*, left rear 100*d*, right rear 100*e*, and right front 100*f* quadrants.

Conventional detection generally involves sensing only deflection of a shell using a single axis sensor, or detecting deflection and direction using multiple single axis sensors installed at different locations on the shell 104 and/or chassis 102. The disclosed technology comprises a sensor assembly 200 including a single three-axis sensor 202 that can detect both deflection and direction of movement of the shell 104 relative to the chassis 102, for example, by measuring the relationship between the flux measurements of each of the x, y and z axes.

In contrast to traditional obstruction detection, the disclosed sensor assembly 200 includes a single three-axis magnetic sensor 202 and a single magnet 204 which provide directional obstruction detection. The disclosed system solves the problem of determining the location of an obstruction relative to the path of the autonomous device 100. With knowledge of the direction of the obstruction, the autonomous device 100 can be made to maneuver around the obstruction more effectively than if the location of the obstruction were not known.

Further, traditional methods for detecting the direction of an obstruction in this context involve multiple sensors or rely on knowledge of the trajectory of the device, or a correlation between a traction driver state and an obstruction event. Most known solutions in this area involve detecting only the deflection of a shell using a single axis sensor, or detecting deflection and direction using multiple single axis sensors mounted to different locations on the device. However, deflection or movement of the shell 104 relative to the chassis 102 can be caused by an obstruction that is not centered in the path of the autonomous device. The disclosed system and method utilize direct measurement of the direction and magnitude of the obstruction, which provides more information than reliance on knowledge of a trajectory.

Referring to FIG. 2A, the sensor 202 can monitor movement of the mower shell 104 relative the mower chassis 102. As a safety feature, sensing the relative motion of the shell 104 of the mower to the chassis 102 can be used to shut down the robotic mower 100 and/or disable the cutting system 108, for example, in the event the mower 100 is lifted up. Obstruction detection can be used to inform the behavior of the autonomous device 100 for efficiently and reliably dealing with an encountered obstruction.

In an embodiment, the sensor 202 comprises a three-axis sensor in a single discrete package. In an embodiment, the sensor 202 performs measurements of a magnetic field induced by the magnet 204 in X, Y and Z directions. In an embodiment, each if the X, Y and Z measurements can be connected sequentially to a multiplexer, which is connected to an Analog to Digital Converter (ADC) which provides a three-dimensional magnetic flux vector for further evaluation. The sensor 102 can output a digital information signal that contains the flux vector values over an I2C serial communication bus.

The autonomous device 100 evaluates the three-dimensional magnetic flux vector (three-axis magnetic flux vector), comprised of the three sensor values to determine a direction and magnitude of a deflection of the shell 104 relative to the chassis 102. In embodiments, the sensor 202 comprises an Infineon 3D Magnetic Sensor TLV493D-A1B6.

Figure 2B:
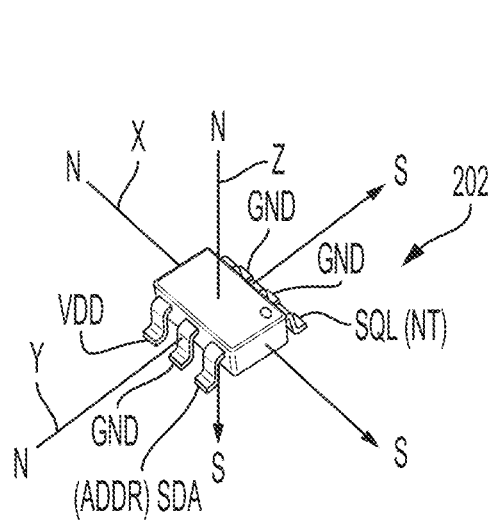
Figure 2C:
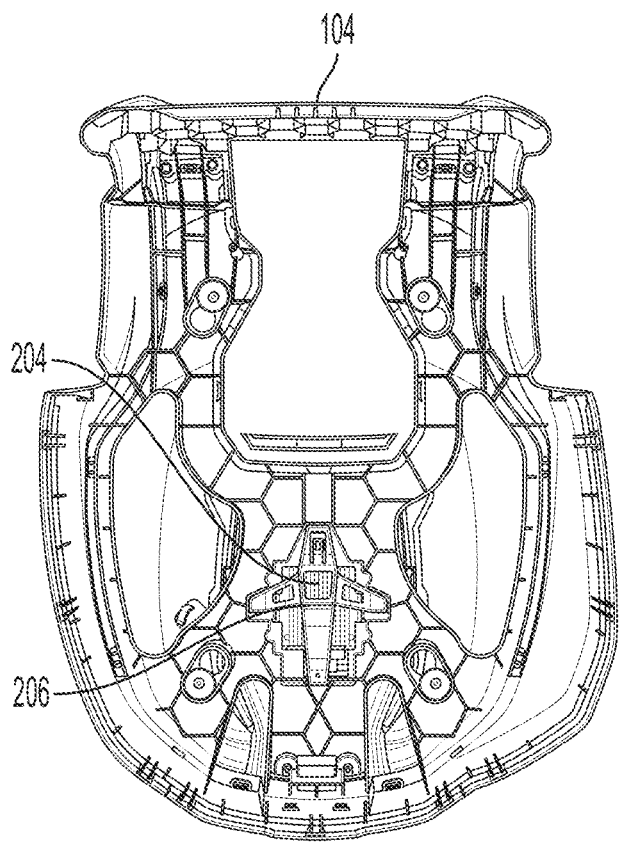

FIGS. 2A, 2B and 2C demonstrate an example placement of the sensor assembly 200 including the sensor 202. In this example, the sensor 202 (TLV493D-A1B6) is located on the robot chassis 102, and the magnet 204 is located on the robot shell 104.

In an embodiment, the magnet 204 is nominally positioned at an offset from the sensor 102. In some implementations of the disclosed technology, the magnet 104 is centered above and in proximity to the sensor 202. In embodiments, the magnet 204 is a cylindrical magnet having diameter of approximately 5 mm, and a height of approximately 10 mm to 20 mm. In an embodiment, the magnet can comprise an axially magnetized cylindrical magnet. Other magnet sizes and shapes can be utilized. The magnet 204 material can comprise, for example, neodymium, samarium cobalt, ceramic/ferrite, and/or hematite.

In the embodiment according to FIG. 2A, the sensor 202 is installed on a printed circuit board and attached to the robot chassis 102 with pin 1 of the sensor facing downwardly, and the top portion of the sensor 202 facing the rear portion 100b of the autonomous device 100. Because of the specialized placement of the sensor 202, a mapping of the sensor magnetic directions to the robot 100 axes is established. FIG. 2B demonstrates the relationship, or mapping, between the sensor axes and the robot axes in this example configuration including both north (N) and south (S) directions in each of the x, y and z axes.

Referring to FIG. 2C, the magnet 204 is located at an inner portion of the shell 104 at the front portion 100a of the autonomous device 100 with the south pole of the magnet 204 facing downwardly. The magnet's 204 south polarity indicates the positive direction of the magnetic field. In an embodiment, the magnet 204 can be secured to an inner portion of the shell 104 adjacent to the sensor 202. For example, the magnet 204 can be held in place utilizing a bracket 204 fastened to, or integrally molded with, the body 104. The sensor 202 is mounted to the robot chassis 102, utilizing for example a printed circuit board, positioned adjacent to the magnet 204. The sensor 202 being in operative communication with the processing component 116.

In the configuration shown in FIGS. 2A-2C, the movement of the shell 104 relative to the chassis 102 in the $x_{mower}$ direction corresponds to the sensor z-axis measurement. The sensor's axes are nominally coincident, or in alignment, with the mower's shell reference frame. Movement of the shell 104 relative to the chassis 102 in the $y_{mower}$ direction corresponds to the sensor y-axis measurement. Movement of shell 104 relative to the chassis 102 in the $z_{mower}$ direction corresponds to the sensor x-axis measurement. The transformation into the shell 104 is given by $$\begin{bmatrix} x_{obs} \\ y_{obs} \\ z_{obs} \end{bmatrix} = \begin{bmatrix} 0 & 0 & 1 \\ 0 & -1 & 0 \\ -1 & 0 & 0 \end{bmatrix} \begin{bmatrix} x_{obs,sensor} \\ y_{obs,sensor} \\ z_{obs,sensor} \end{bmatrix}$$

Figure 3:
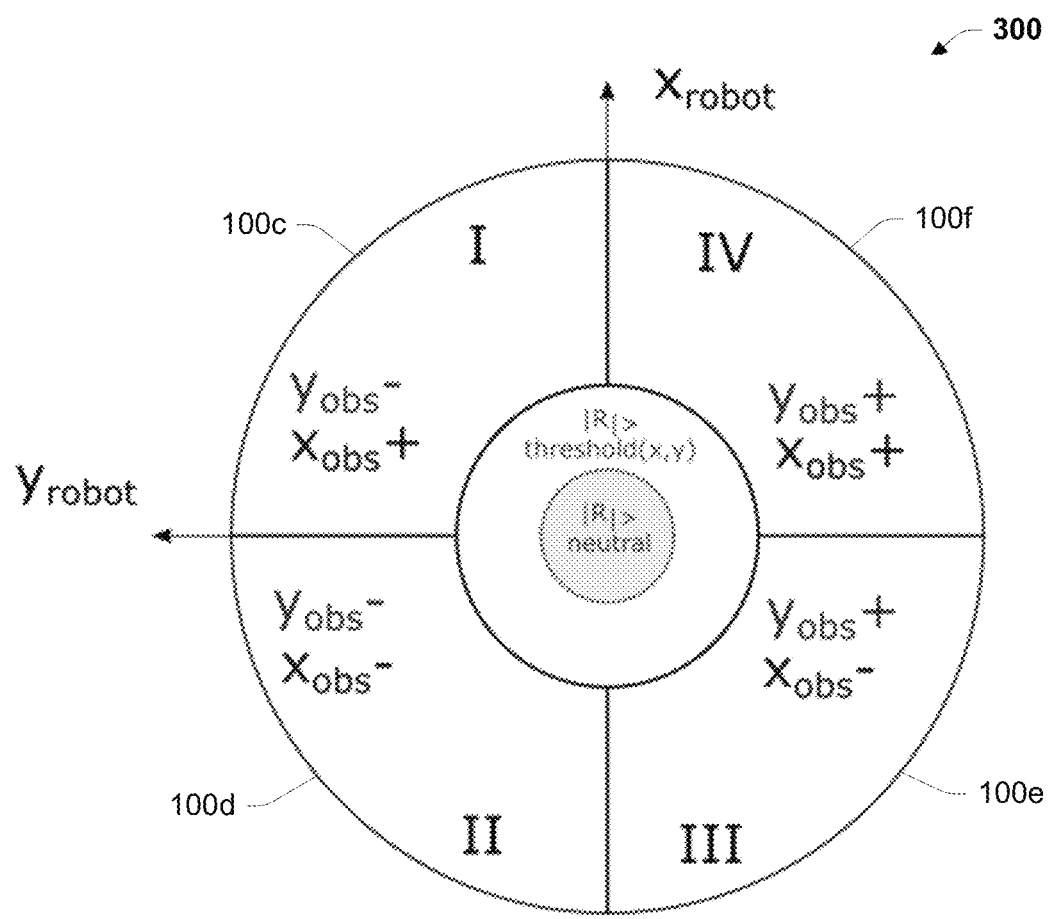
FIG. 3 illustrates a diagram of example mapping of sensor magnetic directions according to one or more disclosed embodiments.

Turning to FIG. 3, displacement of the mower shell 104 relative to the mower chassis 102 results in changes in the magnetic field detected by the sensor 202. FIG. 3 demonstrates the direction of a sensed obstruction resolved into four quadrants, I, II, III, and IV, corresponding to the robot's left front 100c, left rear 100d, right rear 100e and right front 100f quadrants, respectively. The magnetic field is measured on three sensor axes, i.e. the x-axis, y-axis and z-axis.

In an embodiment, the sensor 202 measures the magnetic fields in each of the x-axis, y-axis and z-axis sequentially When the shell 104 is in a neutral position, that is, there is no displacement of the shell 104 relative to the chassis 102, the magnetic field in the $z_{mower}$ direction, the sensor's x-axis measurement, is at its strongest. When the shell 104 is in a neutral position, the magnetic field along the remaining axes, y-axis and z-axis, is nominally zero, or close to zero. When the shell 104 is displaced relative to the chassis 102, the magnetic field measurements made by the sensor 202 change according to the magnitude and direction of the displacement. Detection of the direction of a displacement due to an obstruction can be used to direct mower behavior, for example, the mower can be directed to efficiently and effectively maneuver in the appropriate direction away from an obstruction. In an embodiment, a range of predefined reactions or maneuver movements in response to an obstruction event are defined. Maneuver movements can include combinations of backing up, in-place turning and moving forward. For example, as a response to a front obstruction sensed, the autonomous device 100 is directed to move a defined distance in reverse, turn left or right in its place, and then continue forward.

Maneuver movements can include escape maneuvers, for example, the autonomous device 100 can be directed to turn and move in the opposite direction of a detected obstruction. When sequential obstructions are detected during an escape maneuver, the autonomous device 100 can alternate turning movements, moving first one direction and then another to move between or away from the multiple obstructions more easily. In this way, the autonomous device 100 can avoid becoming trapped in an area such as a corner.

In an embodiment, the processing component 116 of the autonomous device 100 receives the three-axis measurement from the sensor 202 to detect the presence of an obstruction or obstacle, and to determine the obstruction's position or location relative to the autonomous device 100.

FIG. 3 illustrates how the obstructions can be classified. The three-dimensional magnetic flux vector comprised of three sensor values is evaluated, and a measure of the lateral deflection is derived, $R(x_{obs}, y_{obs}, z_{obs})$. When the lateral deflection $|R(x_{obs}, y_{obs}, z_{obs})|$ is greater than a threshold $|bump_{detect,thresh}(x_{obs},y_{obs},z_{obs})|'$ then an obstruction is detected.

$R(x_{obs},y_{obs},z_{obs})$ can be designed to minimize distortions in the threshold due to displacement of the magnet 204 in the z direction, or to otherwise optimize the detection.

Figure 4:
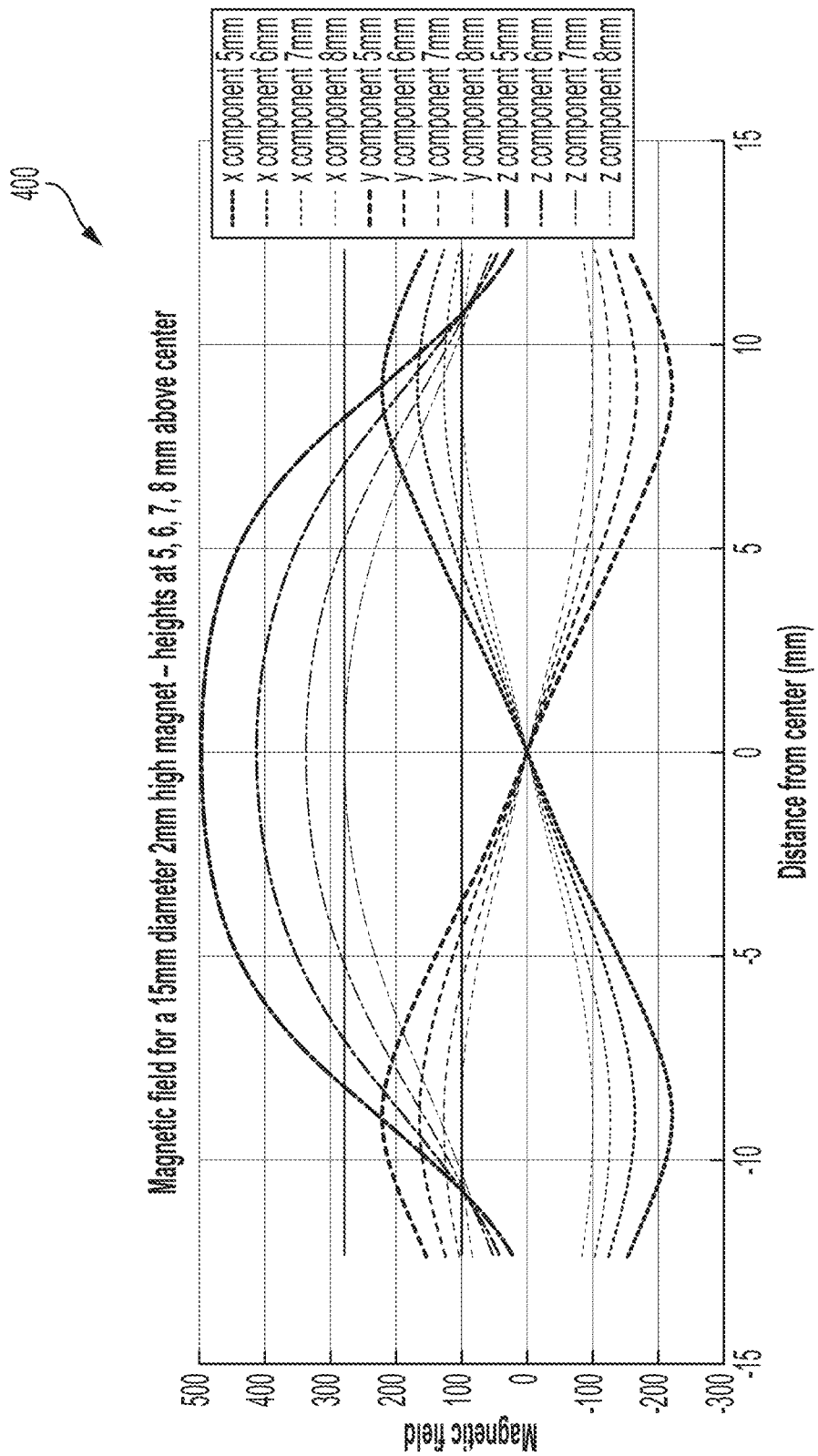
FIG. 4 illustrates a diagram of test data for an example system for obstacle detection for an autonomous device in accordance with aspects of the disclosure.

The graph 400 shown in FIG. 4 demonstrates sensor 202 measurements of the magnetic field at different heights from the center as it travels in the lateral direction When the lateral deflection $|R(x_{obs},y_{obs},z_{obs})|$ is less than a threshold, $|R|<|bump_{detect,thresh}(x_{obs},y_{obs},z_{obs})|$, then an obstruction is detected, and its direction is determined by evaluating the x-axis and y-axis sensor readings, $x_{obs}$ and $y_{obs}$ respectively. The threshold is a function of $z_{obs}$, $x_{obs}$ and $y_{obs}$. Different thresholds can be defined, for example, depending on the direction of the displacement. Different threshold values based on the detected direction of the obstruction can be defined. For example, a front or rear obstruction can be weighted more or less heavily. This provides an advantage in the form of being able to compensate for different mechanical responses to a force applied from different directions. In an embodiment, applying a weighted threshold value enables the tuning of the sensitivity according to the severity of the event.

In an embodiment, the system can be more sensitive to side obstructions as compared to a forward or rear obstruction. Knowledge of the direction of the obstruction allows for a more accurate of the trajectory of the autonomous device 100 relative to the obstruction.

Regardless of the direction and magnitude of the displacement of the magnet 204, when the force displacing the shell 104 is removed, the magnet 204, and thereby the nominal sensor value, will return to a neutral range due to the construction of the shell 104 and chassis 102, and the resilient mounting of the shell 104 to the chassis 102. When the magnetic field detected by the sensor 202 returns to within a neutral range, the system 100 detects that the obstruction has been removed.

Still referring to FIG. 3, the detection of an obstruction direction can be resolved into four quadrants I, II, III, and IV. In further embodiments, the system can be arranged to resolve a deflection to an arbitrarily small angle, for example, the four quadrants can be further divided or otherwise defined to provide a more granular, finely detailed detection. In still further embodiments, a two-axis sensor can be used to resolve a deflection into left/right or front/rear directions, which is an efficient and cost effective solution for many applications.

The mathematical function used to evaluate the threshold, $R(x_{obs},y_{obs},z_{obs})$ can be tuned to the particulars of the configuration, for example, the physical dimensions and other properties of the robot shell 104, robot chassis 102, the magnet type, magnet dimensions, and/or mechanical constraints. In an embodiment, the magnet position can be arbitrarily located relative to the sensor 202, and the mathematical function used to determine the deflection can be adapted to suit the configuration. The ability to adjust the mathematical function that determines the deflection for precise functioning provides flexibility for accommodating a wide variety of autonomous device configurations.

The magnet 104 can be oriented with its axis coincident with the sensor's 102 Z axis having a nominal offset of approximately 5 mm.

Turning to FIG. 4, the graph 400 demonstrates a magnetic field at different heights from the center of the sensor 202 as it travels in the lateral direction. The measure of deflection $R(x_{obs},y_{obs},z_{obs})$ can be calculated to minimize distortions in the threshold due to displacement of the magnet 204 in the z direction, or to otherwise optimize the obstruction detection. FIG. 4 includes data calculated for the magnetic field of a 15 mm diameter, 2 mm high magnet with calculations made for heights of 5, 6, 7, and 8 mm above the center of the sensor 202.

The data demonstrates that a threshold can be defined for x and y, such that if the reading has passed the defined threshold, a detection in a desired range is obtained. The z reading complements the information obtained on the x and y axes. When the magnet is lifted upward, i.e. the shell 104 is lifted or raised upwardly relative to the robot chassis 102, as shown for example in the 8 mm plots, the x and y readings may not pass the threshold, in this case the z reading will be very low.

By determining whether x or y are greater than a threshold, or if z is lower than a threshold, a reliable detection of the direction of the obstruction is obtained.

Figure 5:
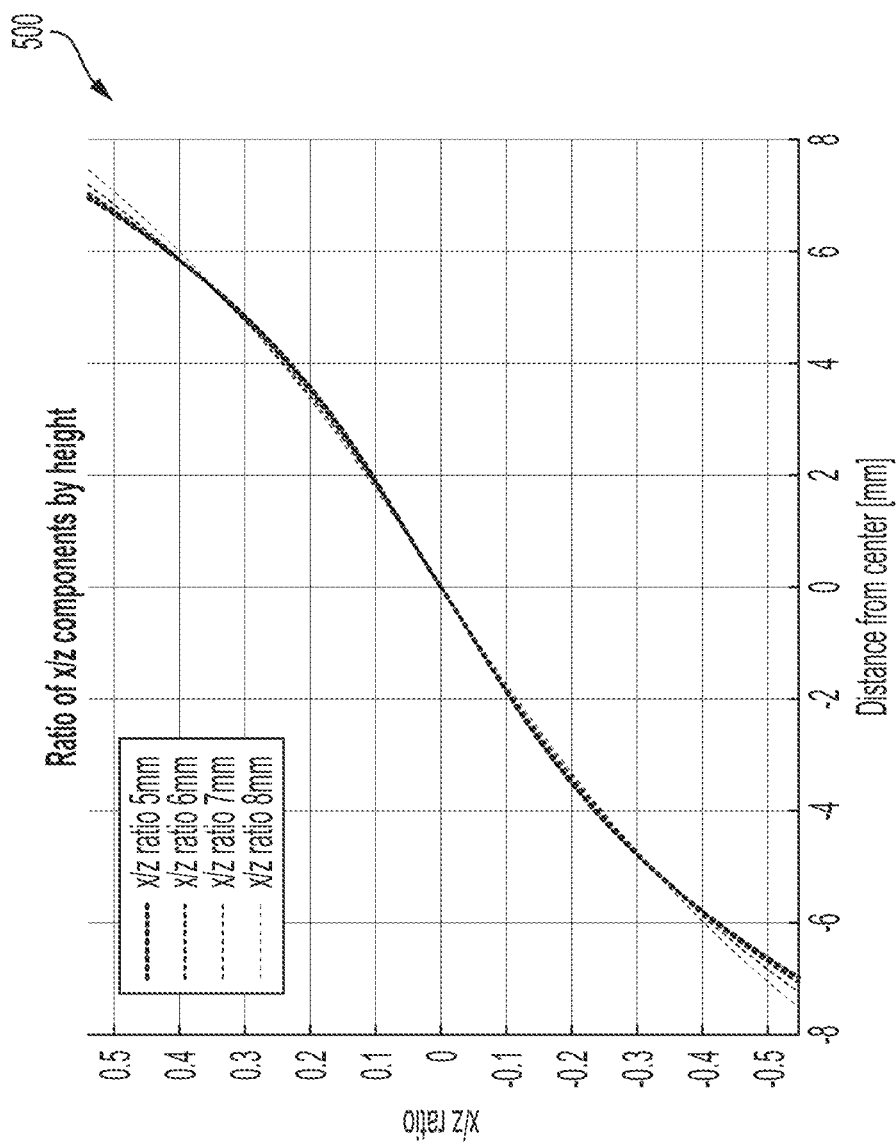
FIG. 5 illustrates a diagram of test data for an example system for obstacle detection for an autonomous device in accordance with aspects of the disclosure.

With reference to FIG. 5, the graph 500 demonstrates z threshold can be flexibly tuned to mitigate the effect of displacement in the Z direction, for example, in the event of a lift or load event. Graphing the ratio $$R = \frac{\sqrt{X^2 + Y^2}}{Z},$$

where X is the x-axis flux measurement, Y is the y-axis flux measurement, Z is the z-axis flux measurement, it can be seen that the function is almost indifferent to the magnet height, and thus serves as a very good criteria for reliable detection. In this exemplary embodiment, the output from the single sensor's 102 three axes is utilized to determine a threshold for displacement, and is intended to mitigate the effect of displacement in the z direction.

In an embodiment, the shell 104 can float over the grass during operation on high grass and keep the magnet 104 higher from the sensor 102 with a much lower absolute reading. Because the ratio is almost unchanged in this configuration, the z threshold remains valid.

In conventional methods, evaluating the absolute Z direction reading can create false events due to lift alone, which does not involve a deflection due to an obstruction. For example, the shell 104 can be jostled and displaced in the Z direction as the autonomous device 100 travels over an uneven or bumpy surface. It is undesirable for this type of motion to cause the detection of an obstruction event. The disclosed technology can eliminate or minimize false obstruction detections caused by cross-coupling between obstruction detection and lift detection.

The expression $$R = \frac{\sqrt{X^2 + Y^2}}{Z}$$

provides an example embodiment for the use of the sensor 202 outputs from the three sensor axes to determine a threshold for displacement that minimizes the effect of displacement in the Z direction. In an embodiment, the sensor 202 outputs from the three sensor axes are used in the expression $K*(X^2+Y^2)/Z^2$, where K is a constant scaler, is utilized to determine a threshold for displacement that minimizes the effect of displacement in the Z direction.

Generally, the illustrated embodiments are not provided as strict limitations on how the disclosed aspects can be practiced by one of ordinary skill in the art, but are intended to be provided as examples that can be modified, interchanged, added to or subtracted from as would be suitable to one of ordinary skill in the art. As a further example, components of disclosed devices can be implemented as connected to other components rather than included within a parent device. For instance, the processing component 116 can be external to autonomous device 100 in one embodiment. Likewise, functionality of the processing component 116 can be aggregated as a single component in some embodiments, or can be separate components. Additionally, it is noted that one or more disclosed processes can be combined into a single process providing aggregate functionality not specifically described herein but known by those of skill in the art.

Figure 6:
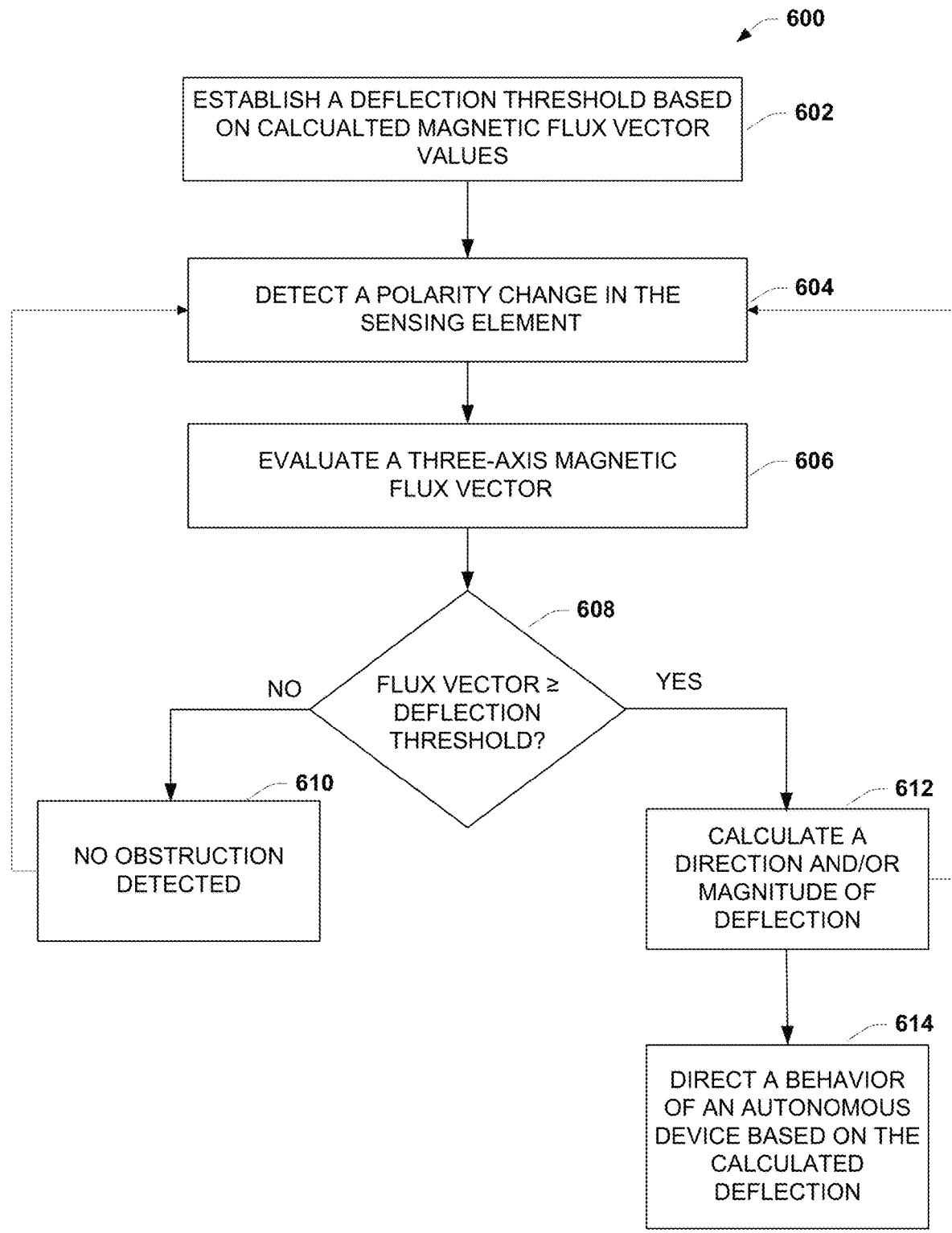
FIG. 6 illustrates a flowchart of an example method for obstacle detection for an autonomous device.

In view of the exemplary diagrams described herein, process methods that can be implemented in accordance with the disclosed subject matter will be better appreciated with reference to the flowcharts of FIG. 6.

Referring to FIG. 6, there is depicted a flowchart of a sample method 600 for practicing various embodiments of the disclosed technology. In one or more embodiments, method 600 (and other methods disclosed herein) can be implemented by a suitable computing device, electronic control device, one or more applications executing on such device, either alone or in combination with one or more other processor, server or memory devices interconnected by a communication networks, or the like. For instance, the disclosed methods can be executed at least in part by a processor coupled with a memory that stores process instructions suitable to carry out steps or operations defined by method 600 and other disclosed methods, although the subject disclosure is not limited to this example structure.

At 602, method 600 can comprise establishing a deflection threshold based on calculated magnetic flux vector values. The mathematical function used to evaluate the threshold, can be tuned to the particulars of the configuration, for example, the robot shell 104, robot chassis 102, magnet 204 type, magnet 204 dimensions, and/or mechanical constraints. In an embodiment, the magnet 204 position can be arbitrarily located relative to the sensor 202, and the mathematical function used to determine the deflection can be adapted to suit the configuration. The ability to adjust the mathematical function that determines the deflection for precise functioning provides flexibility for accommodating a wide variety of autonomous device configurations. In some embodiments, for example, other suitable input parameter data disclosed herein, known in the art or made known to one of skill in the art by way of the teachings disclosed herein are considered within the scope of the disclosure.

At 604, method 600 can comprise detecting a polarity change in the sensor 202. As discussed in detail supra, displacement of the shell 104 and the magnet 204 relative to the chassis 102 results in changes in the magnetic field detected by the sensor 202.

At 606, method 600 can comprise evaluating a three-axis magnetic flux vector. In an embodiment, the sensor 202 generates a three-dimensional magnetic flux vector comprised of, for example, three sensor values.

At 608, a decision is made as to whether the flux vector is greater than or equal to the pre-established threshold value. If the flux vector is less than the pre-established threshold value (NO), method 600 can proceed to 610 and no obstruction is detected. The method 600 can then return to 604 and detecting a polarity change in the in the sensor 202, alternatively the method 600 can then end.

Otherwise, if the flux vector is equal to or greater than the pre-established threshold value (YES), the method 600 proceeds to 612. At 612, method 600 can comprise calculating a direction and/or magnitude of the deflection. In an embodiment, the processing component 116 of the autonomous device 100 receives and evaluates the three-axis measurement from the sensor 202 to detect the presence of an obstruction or obstacle, and to determine the obstruction's position or location relative to the autonomous device 100.

At 614, method 600 can comprise directing a behavior of the autonomous device 100 based on the calculated deflection, for example, the mower can be directed to efficiently and effectively maneuver away from an obstruction. The method 600 can then return to 604 and detecting a polarity change in the in the sensor 202, alternatively the method 600 can then end.

In one or more embodiments, method 600 can be implemented by processing component 116, or a suitable computing device, electronic control device, processing component, one or more applications executing on such device, either alone or in combination with one or more other processor, or memory devices interconnected by a communication network(s), or the like. For instance, the disclosed method can be executed at least in part by a processor coupled with a memory that stores process instructions suitable to carry out steps or operations defined by method 600 (or other disclosed methods), although the subject disclosure is not limited to this example structure.

While for purposes of simplicity of explanation the methods of FIG. 6 are shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all of the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

What has been described above includes examples of the subject innovation. It is, of course, not possible to describe every conceivable combination of devices, components thereof or method steps for purposes of describing the subject disclosure, but one of ordinary skill in the art can recognize that many further combinations, additions, subtractions and permutations are possible. Accordingly, the disclosed subject matter is intended to embrace all such alterations, modifications and variations that fall within the spirit and scope of the disclosure. To the extent that the term "includes", "including", "has" or "having" and variants thereof is used in either the detailed description or the claims, such term is intended to be inclusive in a manner similar to the term "comprising" as "comprising" is interpreted when employed as a transitional word in a claim.

The word "exemplary" where used herein is intended to mean serving as an example, instance or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or". Accordingly, unless specified otherwise or clear from context, "X employs A or B" is intended to mean any of the natural inclusive permutations of A or B. That is, if X employs A, X employs B; or X employs both A and B, then "X employs A or B" is satisfied. In addition, the articles "a" and "an" as used in this application and the appended claims should generally be construed to mean "one or more" unless specified otherwise or clear from context to be directed to a singular form.

The invention claimed is:

1. An autonomous device comprising:
a chassis including a drive system, wherein the chassis is movable relative to a working surface;
a shell resiliently mounted to the chassis and movable relative to the chassis in response to a force applied to the shell;
a sensor assembly comprising a single sensor disposed on the chassis; and
a magnet disposed on and movable with the shell in response to the force applied to the shell, wherein the sensor is configured to output a three-axis magnetic flux vector in response to a deflection of the magnet; wherein relative motion between the single magnet and the single sensor causes the sensor to produce output signals; and
a processing component configured to receive the output signals from the sensor and to determine at least one of a direction of the deflection and a magnitude of the deflection of the shell relative to the chassis, wherein:
the processing component is configured to establish a deflection threshold based on an expected value of the three-axis magnetic flux vector, wherein the three-axis magnetic flux vector comprises an X axis value, a Y axis value and a Z axis value, and
the deflection threshold R is substantially equal to either:

$$R = \frac{\sqrt{X^2 + Y^2}}{Z},$$

or

R=K*(X^2+Y^2)/Z^2, where K is a constant scaler, and wherein X is the X axis value, Y is the Y axis value, and Z is the Z axis value of the three-axis magnetic flux vector.

2. The autonomous device of claim 1, wherein the magnet comprises a single magnet secured to an inner surface of the shell.

3. The autonomous device of claim 1, wherein the three-axis magnetic flux vector comprises an electrical signal indicative of at least one of a direction and a magnitude of the deflection of the magnet relative to the sensor.

4. The autonomous device of claim 1, wherein the three-axis magnetic flux vector comprises a serially transmitted digital signal including magnetic flux information.

5. The autonomous device of claim 1, wherein the processing component is configured to determine that the autonomous device has contacted an obstruction in the work surface based on the sensor output signals.

6. The autonomous device of claim 1, wherein the processing component is configured to determine that the autonomous device has contacted an obstruction in the work surface when the sensor output signals are equal to or greater than the deflection threshold.

7. The autonomous device of claim 1, wherein the processing component directs a behavior of the autonomous device based on at least one of the direction of the deflection or the magnitude of the deflection of the shell relative to the chassis.

8. The autonomous device of claim 7, wherein the directed behavior of the autonomous device comprises at least one of: halting operation, navigating around an obstruction, or moving in a direction opposite to the obstruction.

9. The autonomous device of claim 1, wherein the magnet is axially polarized, and the magnet is oriented with a magnetic axis coincident with one of: the X axis, the Y axis or the Z axis of the single sensor.

10. The autonomous device of claim 1, wherein the autonomous device comprises a robotic lawn mower.

11. A mobile robot comprising:
a chassis movable relative to a working area, the chassis comprising a single piece three-axis detection sensor; and
a shell mounted on the chassis and movable relative to the chassis in response to a force applied to the shell, the shell comprising:
a magnet attached to and movable with an inner surface of the shell in response to the force applied to the shell, wherein the sensor is configured to output a three-axis magnetic flux vector including measurements in each of a X axis, Y axis and Z axis in response to a movement of the magnet, the electrical signal indicative of at least one of a direction and a magnitude of a deflection; wherein relative motion between the single magnet and the single sensor causes the sensor to produce output signals; and a processing component configured to receive the output signals from the sensor and to determine at least one of a direction of the deflection and a magnitude of the deflection of the shell relative to the chassis, wherein:

the processing component is configured to establish a deflection threshold based on an expected value of the three-axis magnetic flux vector, wherein the three-axis magnetic flux vector comprises an X axis value, a Y axis value and a Z axis value, and the deflection threshold R is substantially equal to either:

$$R = \frac{\sqrt{X^2 + Y^2}}{Z},$$

or

R=K*(X^2+Y^2)/Z^2, where K is a constant scaler, and wherein X is the X axis value, Y is the Y axis value, and Z is the Z axis value of the three-axis magnetic flux vector.

12. A method for use in an autonomous device comprising:

a single piece three-axis detection sensor, wherein the sensor is configured to sense a polarity of a single movably arranged magnet and to generate a three-axis magnetic flux vector comprising:

detecting a polarity change in the sensor, evaluating, by a processing component, the three-axis magnetic flux vector in detecting whether an obstruction has been detected;

calculating at least one of: a direction and a magnitude of a deflection based on the evaluation; and establishing a deflection threshold based on an expected value of the three-axis magnetic flux vector, wherein the three-axis magnetic flux vector comprises an X axis value, a Y axis value and a Z axis value, wherein: the deflection threshold R is substantially equal to either:

$$R = \frac{\sqrt{X^2 + Y^2}}{Z},$$

or

R=K*(X^2+Y^2)/Z^2, where K is a constant scaler, and wherein X is the X axis value, Y is the Y axis value, and Z is the Z axis value of the three-axis magnetic flux vector.

13. The method of claim 12, wherein the detection sensor is arranged on a chassis of a robotic mower and the movably arranged magnet is arranged on a shell of the autonomous device in proximity to the detection sensor; and wherein the deflection comprises a lateral deflection of the shell relative to the chassis.

14. The method of claim 12, comprising:

directing a behavior of the autonomous device based on the calculated direction of the deflection.

15. The method of claim 12, comprising:

directing a behavior of the autonomous device based on the calculated magnitude of the deflection.

16. The method of claim 12, comprising:

directing a behavior of the autonomous device based on the calculated direction and the calculated magnitude of the deflection.

17. The method of claim 12, wherein evaluating the three-axis magnetic flux vector comprises:

comparing the deflection to the deflection threshold; and detecting the obstruction when the deflection is greater than or equal to the deflection threshold.

* * * * *